United States Patent Office 2,995,950
Patented Aug. 15, 1961

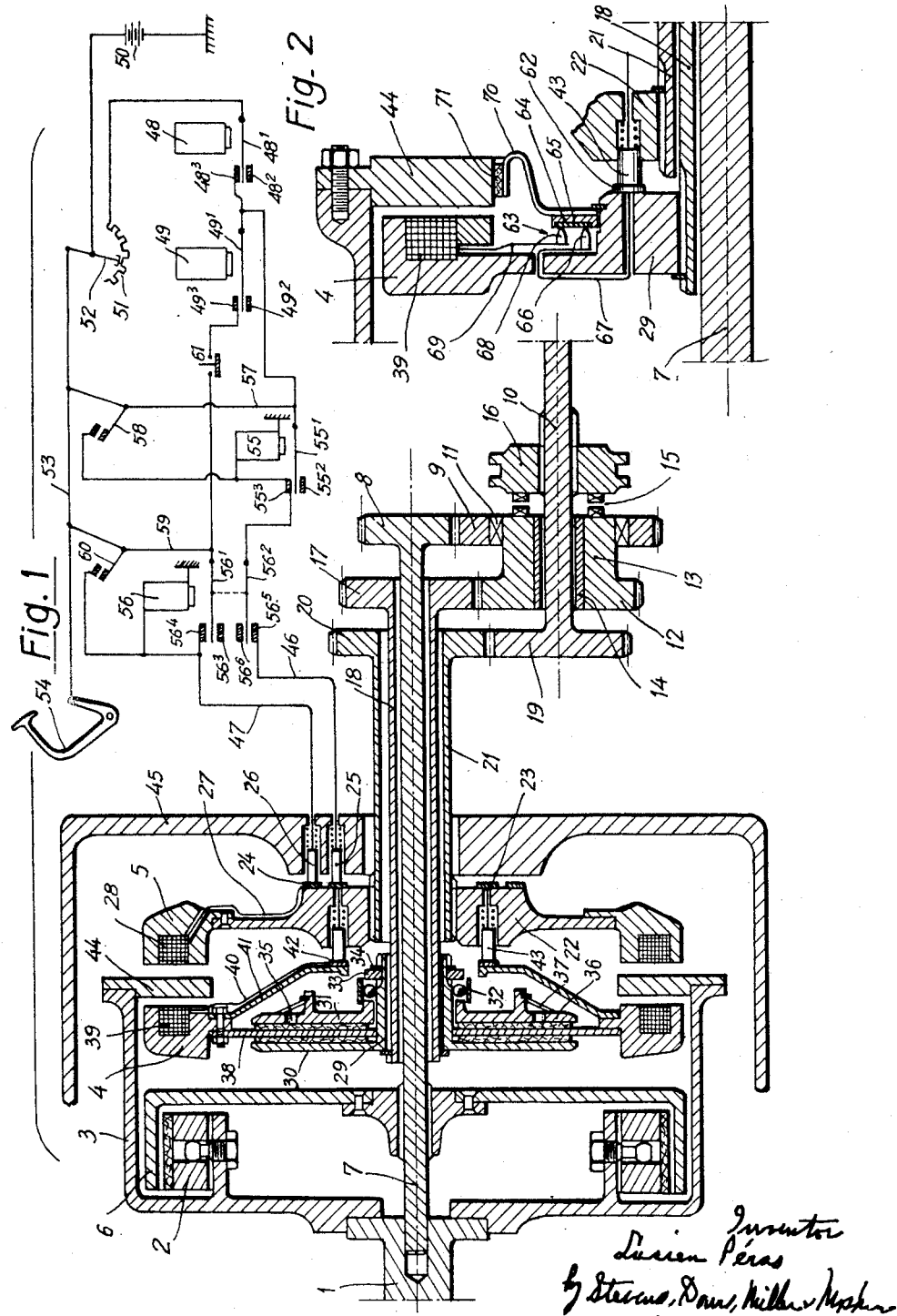

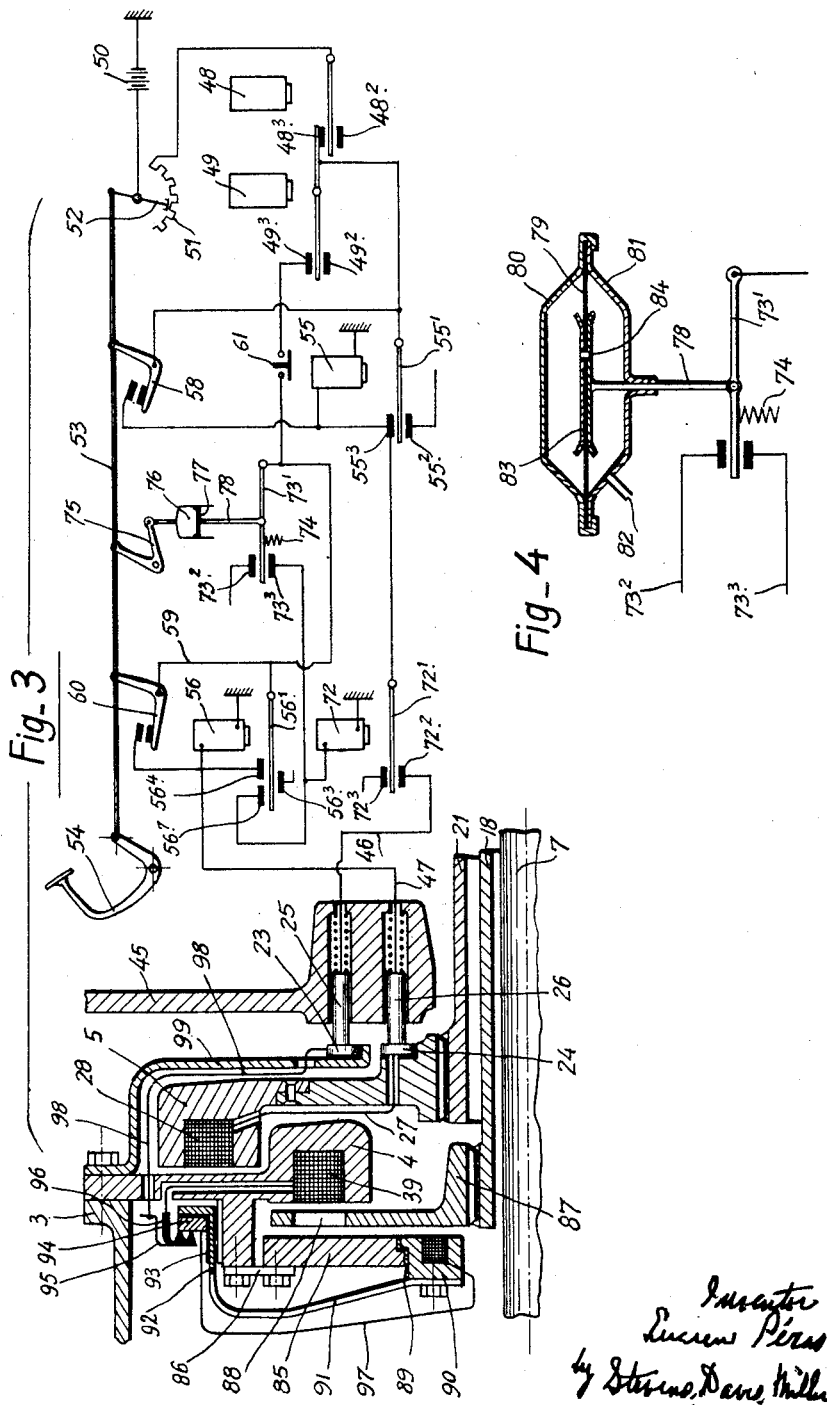

2,995,950
TRANSMISSION MECHANISMS, NOTABLY FOR AUTOMOTIVE VEHICLES
Lucien Péras, Billancourt, France, assignor to Regie Nationale des Usines Renault, Billancourt, France, French works under control of the French Government
Filed May 9, 1958, Ser. No. 734,273
Claims priority, application France May 20, 1957
10 Claims. (Cl. 74—472)

The present invention relates to transmission mechanisms in general and has specific reference to a transmission mechanism of the type utilizing for the first or lower forward gear as well as for the reverse an automatic starting clutch of a type already known per se such as a centrifugal clutch, a hydraulic coupling, etc., the higher forward speeds (for example the intermediate gear or gears and the top gear) being obtained through separate electromagnetic dry clutches.

Anybody conversant with the art knows that one of the chief difficulties encountered for obtaining satisfactory gear changes with clutches of these known types is their lack of inherent progressiveness which tends to produce a shock when engaging a gear without disconnecting the engine torque; this is notably the case when the gear change is controlled by an automatic governor or like device.

On the other hand, with these clutches, particularly dry ones, it is difficult to prevent some tearing up of the friction faces from taking place when engaging the clutch under load with a certain amount of slipping.

Now it is the object of the present invention to provide a specific arrangement of these clutches and of the means for supplying energizing current thereto, whereby the clutch engagement takes place under no-load or very moderate load conditions in order to avoid fierceness in the transmission and eliminate any abnormal tearing up of the contacting surfaces.

To this end and according to an essential feature of this invention, the transmission mechanism comprises a freewheel device inserted in the first or low gear torque-transmitting path, and each one of the other gears providing a lower reduction ratio is engaged through an electromagnetic clutch adapted to connect a member rotatably fast with the engine to a shaft driving the output shaft of the mechanism with the desired transmission ratio, the engagement of each gear when changing up from the next lower gear being only possible when the accelerator pedal—or generally any member controlling the engine power output—is in the closed position to disconnect the engine torque, the electromagnetic clutches being supplied preferably with only one fraction of their energizing current during this operation; this interlocking action is obtained for example by utilizing an adequate system incorporating electric relay means.

Moreover, and as permitted by the aforesaid relay means it is possible to change down from one of these gear ratios to the next lower ratio without discontinuing the engine torque, the mechanism according to this invention comprising to this end, on the clutches associated with the intermediate gears, adequate devices adapted to eliminate or reduce to a substantial extent, notably when changing down to a lower gear, any fierceness or shuddering from the transmission. Means are also provided for preventing at will the changing up to the upper gear or gears, so that the engine may be used for braking purposes through the intermediate gear or gears outside the lowest or first gear.

Finally, as the changing up from an intermediate gear to the next higher gear necessitates the closing of the throttle, means are provided according to this invention for preventing the engine from exerting an undesired retarding action on the vehicle during the short time period elapsing between the beginning of this throttle closing manoeuvre and the actual gear change.

These and other features and advantages of the present invention will become more apparent as the following description proceeds with reference to the accompanying drawings forming part of this specification and illustrating diagrammatically by way of non-limiting example a typical application of the invention to a three-speed and reverse transmission mechanism designed more particularly for automotive applications. In the drawings:

FIGURE 1 is a longitudinal section of the mechanism associated with a wiring diagram showing the circuitry of the electromagnetic clutches;

FIGURE 2 is a fragmentary half longitudinal section illustrating a modified embodiment of the intermediate gear clutch;

FIGURE 3 is a half longitudinal section showing another modified embodiment of the electromagnetic clutches with the wiring diagram of the clutch control means, and FIGURE 4 is a diagrammatic section illustrating a switch control device constituting a modification of the devices illustrated in FIG. 3.

Referring first to FIG. 1, there is illustrated a three-speed transmission wherein the output shaft is on the side opposite to, but not aligned with the input shaft. Of course, this invention is also applicable to a change-speed gear of the type having the output and input shafts located on the same side, or to a transmission of the direct-drive type wherein the output shaft is opposite to, and axially aligned with, the input shaft. In this figure, the reverse gearing is not illustrated as it is immaterial as far as the invention is concerned.

The engine shaft 1 drives permanently the input shaft of an automatic clutch 2 constituting the starting clutch; in this embodiment the starting clutch 2 is of the radial centrifugal type, but as already indicated any other similar purpose device may be used to this end, for example a hydraulic coupling, an electromagnetic clutch energized from the generator, or any other suitable device of known character.

The driving shaft 1 is also rotatably fast with a bell-shaped member 3 engageable by two electromagnetic clutches 4, 5 as shown, in the case of a three-speed transmission.

The input member 2 of the starting clutch is adapted progressively to drive from a predetermined minimum engine speed the output member 6 rigid with the first- or low gear shaft 7.

The driving pinion 8 of the low-gear transmission path is rigid with the other end of the shaft 7 and in meshing engagement with the low-gear driven pinion 9 coaxial with the output shaft 10 of the transmission. However, this driven pinion 9 drives in turn the shaft 10 only through the medium of a freewheel device 11 and of the intermediate-gear driven pinion 12 having its hub 13 mounted for loose rotation on the shaft 10 by means of a plain bearing 14; however, this pinion 12 may be caused to rotate bodily with the shaft 10 by providing a dog-clutch member 15 of which the receiving member 15 consists of a sliding hub mounted through splines on the output shaft 10. The dog-clutch member 15 may be completed if desired by a synchronizing device of known construction.

The driven pinion 12 of the second or intermediate gear path meshes with the corresponding driven pinion 17 rigid with a tubular shaft 18 carrying on its other ends, through splines, the electromagnetic clutch 4.

Rigid with the shaft 10, the driven third gear or top gear pinion 19 is in meshing engagement with the corresponding driving pinion 20 solid with the tubular shaft 21 carrying through splines on its other end the clutch 5.

From the foregoing it is clear that when the low or first gear shaft 7 alone drives the output shaft 10, the plates of the intermediate and top gear clutches 4 and 5 are rotatably driven with the corresponding gear reduction, and when one of these clutches is engaged it also rotatably drives the plate of the other clutch, while the freewheel device 11 enables the pinion 9 drivingly coupled to the low or first gear shaft through the pinion 8 to rotate at a speed lower than that of pinion 12.

The hub 22 of clutch 5 carries a pair of insulated collector rings 23, 24 contacting the brushes or sliding contacts 25, 26 of which the electrical connections will be defined presently.

The ring 24 is connected through a conductor 27 to the winding 28 of clutch 5, the clutch being grounded.

The hub 29 of the second or intermediate gear clutch 4 carries this clutch through the medium of a torque-limiting device of any known and adequate type, for example of the type set forth hereafter.

The hub 29 is provided with a clutch plate 30 rigid therewith. It carries on the other hand another clutch plate 31 to which it is connected through helical guiding means consisting in the example illustrated of an annular set of balls 32 each contacting two registering inclined ramps carried the one by the hub of plate 31 and the other by a ring 33 rigid with the hub 29 and retained by a circlips or like retainer 34.

The clutch plate 31 is adapted to drive through the medium of notches 35 a pilot plate 36 constantly urged in the direction of the other plate 30 by a spring 37 consisting in the example shown of a dished washer engaging a groove formed on an annular projection of the plate 31, as shown.

Between the plates 30, on the one hand, 31 and 36, on the other hand, a disk 38 lined with friction material is clamped.

This mechanism is adapted to transmit in a certain direction, which is the direction of rotation of the driving engine, a torgue of a value equal to or higher than the maximum engine torque, with the two plates 31 and 36 clamping the friction lining of disk 38 therebetween and in the reverse direction a torque equal to or higher than the reaction torque of the engine, which is only one fraction of the aforesaid engine torque, the plate 36 alone clamping the friction lining of disk 38 from which the plate 31 is now kept away. Of course, any other suitable torque-limiting device adapted to meet these requirements may be substituted therefor.

Bolted on the disk 38 is the yoke of clutch 4 having its coil 39 energized through a conductor 40 and grounded. This conductor 40 is carried by a bell-shaped member 41 bolted on the yoke 4 and provided with an insulated ring 42 connected to this conductor 40. A brush or like sliding contact member 43 contacts the ring 42, is carried by the hub 22 and electrically connected to the insulated ring 23.

The armature carried by the bell-shaped member 3 and common to both clutches 4 and 5 is designated by the reference numeral 44; on the other hand, the stationary clutch casing carrying the current lead-in brushes or sliding contacts 25, 26 is designated by the reference numeral 45.

In the wiring diagram forming part of FIG. 1 the reference numerals 46 and 47 designate the conductors supplying current to the brush contacts 25 and 26. Besides, the reference numerals 48, 49 designate the coils of the two relays controlled by a governor device (not shown) to control in turn the automatic gear change as a function of the engine load and of the velocity of the vehicle, this governor device being of any known and suitable type.

The armature of relay 48 is designated by the reference numeral $48^1$ and comprises a back contact $48^2$ and a front contact $48^3$; this relay is adapted to control the gear change from the first or low gear to the second or intermediate gear. The other relay 49 comprising an armature $49^1$, a back contact $49^2$ and a front contact $49^3$ controls the passage from the second or intermediate gear to the third or top gear.

The armature $48^1$ is fed from the storage battery 50 of the vehicle through a variable resistor 51 having its sliding contact 52 connected through a linkage rod 53 to the accelerator pedal 54. The variable resistor 51 has zero value when the accelerator pedal is fully depressed, and a maximum value when the pedal is released or in its throttle-closing position.

Inserted in the energizing circuits of the intermediate and top gear clutches are two other relays 55 and 56, respectively. Relay 55 is a single-type relay having its armature $55^1$ displaceable between a back contact $55^2$ and a front contact $55^3$. On the other hand, relay 56 is a double relay of which the armature carries or is associated with, two separate conductors $56^1$ and $56^2$ co-acting the former with the back contact $56^3$ and front contact $56^4$, the latter with the back contact $56^5$ and front contact $56^6$.

The armature $55^1$ and front contact $55^3$ of relay 55 are connected through a circuit section 57 in which a switch 58 adapted in its closed position to supply energizing current to the coil of relay 55 is inserted. This switch 58 is connected to the control rod 53 so that it is closed only when the accelerator pedal is fully released.

Similarly, the armature $56^1$ is connected to the front contact $56^4$ through a circuit section 59 in which a switch 60 adapted to supply energizing current to the coil of relay 56 is inserted. This switch 60 is controlled by the rod 53 so that it is closed only when the accelerator pedal is fully released.

Finally, a switch 61 is inserted in the conductor connecting the contact $49^3$ to the armature $56^1$.

The mechanism so far described operates as follows:

Assuming the vehicle stationary with its engine idling, the first gear clutch 2 is disengaged. No torque is transmitted to the mechanism, and the driver, by actuating the sliding dog-clutch 16, may engage either the reverse (not shown) or the forward drive by engaging the dog teeth 15 of members 15 and 13 with one another.

When the enine is accelerated, the centrifugal clutch 2 is progressively engaged and drives the bell-shaped member 6, shaft 7, and, through pinions 8 and 9, wheel 11, pinion 12, dog teeth 15 and sliding gear 16, the output shaft 10 and therefore the wheels of the vehicle through the first-gear reduction ratio; under these conditions, it is clear that none of the electromagnetic clutches are operated, the plates 4 and 5 being simply carried along as already indicated.

When the proper vehicle speed and engine load conditions for changing to the intermediate gear are attained, the governor device energizes the relay 48 and as a consequence current flows through the armature $55^1$. As the coil 55 is not energized as long as the driver depresses the accelerator pedal, the second-speed electromagnetic clutch 4 remains inoperative.

This clutch 4 is energized only when the driver releases the accelerator pedal to enable the switch 58 to close, thus energizing the relay coil 55 to cause the relevant armature $55^1$ to engage its front contact $55^3$ and consequently energize the other armature $56^2$. As the coil 56 is not energized, this armature $56^2$ engages the back contact $56^5$ and energizes, through conductor 46, contact brushes 25, 43 and the corresponding slip rings, the coil 39 of the second gear clutch which is thus engaged when the engine torque is neutralized as the accelerator pedal 54 is released. For the same reason, the variable resistor 51 is at its minimum value, so that this clutch 4 is energized and operated under low-current conditions as well as at a lower speed discrepancy between the engine shaft 1 and clutch 4. As a consequence, the vehicle is driven through the second or intermediate gear, the relay 55 being held in its energized condition by the contact 55³.

When the vehicle and engine speeds are such as to justify the change to top or third gear, the governor device energizes the relay 49 while maintaining the energization of relay 48, thus causing current to be supplied to contact 49³, assuming that switch 61 is closed, that is, in its normal running position.

As long as the driver depresses the accelerator pedal, the relay 56 remains de-energized and its armature 56¹ engages the insulated back contact 56³, so that the top-speed clutch is not energized while the second-speed clutch is kept in its energized condition.

As the driver releases the accelerator pedal 54 he allows the switch 60 to close and therefore causes the relay 56 to be energized. The movement of the double armature of this relay will simultaneously on the one hand de-energize the second-speed clutch and on the other hand energize the third-speed clutch through the contact 56⁴, conductor 47 and brush contact 26. As in the preceding case, this clutch is engaged while the engine torque is neutralized and the variable resistor 51 has its maximum value, so that the clutch engagement takes place very smoothly.

The change from top gear to intermediate gear can be effected irrespective of the throttle pedal position; to this end, the governor device de-energizes the relay 49. As the relay 56 was previously energized through relay 49, it is now also de-energized and resumes its second-gear position, thus disconnecting the clutch 5 from the current supply and re-energizing the other clutch 4.

It is possible, if the gear change from third or top gear to second or intermediate gear takes place when the driver has fully depressed the accelerator pedal, that the clutch 4 be energized with the maximum current strength, as the variable resistor 51 is in its zero-current position, and that nevertheless there is a substantial discrepancy between the rotational speeds of yoke 4 and armature 44, as the engine operatively connected to this armature 44 did not have enough time to accelerate from the speed previously attained by the engine in third gear to the speed to be obtained in second gear to maintain the vehicle at a practically unchanged road speed. The engagement of clutch 4 under these conditions is obviously likely to produce a shock or jolt unpleasant for the passengers of the vehicle and detrimental to the mechanical parts, since a certain energy would be taken from the momentum of the vehicle to accelerate the engine, thus producing a fierce braking effect. This shock or jolt is avoided or at least substantially reduced according to this invention by the provision of the torque limiting device which cannot transmit a negative or reaction torque of a value higher than that for which it is adjusted; should this torque exceed this adjustment value, the device would introduce a certain amount of slipping in the transmission until the rotational speed of the yoke 4 is substantially equal to that of the hub 29 and therefore the second-gear shaft 18.

When this change-down operation takes place under low engine load conditions, the device operates in the same direction but in addition the engine torque as well as the energizing current fed to clutch 4 are limited, thereby avoiding any detrimental shock in the transmission.

The switch 61 is disposed within easy reach of the driver's hand and its function, when open, is to eliminate the top gear and limit the operation of the mechanism to the first and second gears only. Its purpose is notably to permit the braking of the vehicle by the engine through the second-speed gear ratio, for example on a long downhill road. The change to the engine-braking condition through the second-speed ratio is also very smooth by virtue of the torque-limiting device associated with the second-speed clutch.

In the modified embodiment illustrated in FIG. 2, the second-speed clutch 4 is not mounted through a torque-limiting device on its hub, but the energization of its coil 39 from the brush 43 in frictional engagement with the slip ring 62 takes place through the medium of a switch assembly designated by the reference numeral 63 and having the following component elements:

A rotary member 64 of a material having a very low electrical conductivity is mounted for free rotation on the hub 29, its angular movement with respect thereto being limited by stops or check members defining two end positions. In one of these end positions the member 64 is leading relative to the hub 29 (in the direction of rotation of the engine), and a plate 65 of electrically conducting material makes contact between a brush 66 electrically connected through wire 67 to the slip ring 62, and another brush 68 connected through another wire 69 to the coil winding 39.

In the other end position (in which the member 64 is lagging relative to the hub 29 in the direction of rotation of the engine), the two brushes 66, 68 contact an insulating portion of member 64 and consequently the coil winding 39 is de-energized.

Mounted on the member 64 by means of flexible members such as springs 70 are friction contacts 71 engaging with a moderate force the armature 44 or a member which, like this armature, is rotatably connected to the engine.

The second-gear clutch thus constructed operates somewhat in the fashion of a freewheel device; in other words, when the engine rotated at a speed lower than that of the clutch 4, the frictional engagement between the friction contacts 71 and the armature 44 urges the member 64 to the position in which the coil winding 39 is de-energized, so that no torque can be transmitted between the engine and the clutch 4. If, on the contrary, the engine tends to rotate faster than the clutch 4, this member 64 is urged to the position in which the coil winding 39 is energized, and, provided that at this time the brush 43 is connected to a source of current, the armature 44 connected to the engine will rotate bodily with the clutch 4 from the time when their speeds become equal, and under these conditions the engine torque will be transmitted smoothly to the shaft 18 of clutch 4.

The difference with an ordinary freewheel device lies in the fact that from the moment when the clutch has been engaged, as described in the preceding paragraph, and as long as the supply of current to the brush 43 is not discontinued, the torque will be transmitted in either direction, that is when it is a retarding torque as well as when it is a driving torque, through the clutch 4.

The operation of the mechanism when the second-gear clutch is constructed according to the modified embodiment illustrated in FIG. 3 is the same as that described hereinabove as far as the change from one gear to a higher gears is concerned, that is, when changing up from first to second and from second to third gear. In fact, when changing up from first gear to second gear, as the energizing current is supplied to brush 25 and therefore to brush 43, the engine rotates faster than the second-gear clutch, the switch 63 is in the position permitting the passage of current and the assembly operates as if this switch were not provided. Similarly, to change up from second to third or top gear, the presence of the switch 63 is immaterial as far as the operation of the mechanism is concerned.

On the other hand, when changing down from top or third gear to second or intermediate gear (this change being possible irrespective of the position of the accelerator pedal), the rotional speed of the engine previously connected through the clutch 5 to the third-speed shaft rotates is always slower than that of the second-gear shaft and therefore than that of the clutch 4 at the time when the governor device supplies current to this clutch.

Under these conditions, the switch 63 is in the position whereby the supply of energizing current to the coil winding is discontinued, so that the clutch 4 will not be engaged immediately and no shock will occur. The clutch engagement will take place only when the engine, having been accelerated as a result of the disconnection of the third-speed clutch, will attain the same speed as the second-speed shaft. It will then control the movement of switch 73 and as a consequence the clutch 4 will be engaged without any shock since its relative speed with respect to the armature 44 will still be practically null.

During the actuation of switch 61 for controlling the braking action from the engine through the second-gear ratio, the operation will be the same as described hereinabove if the vehicle is in second gear. If, on the other hand, the vehicle is either in third or first gear with the freewheel device inserted in the transmission, and the engine idling or rotating at a low speed, the switch 63 will be opened and the transmission will take place through this freewheel device as long as the engine has not been accelerated sufficiently to attain the rotational speed of the second-gear shaft. In this case, if the driver wants to set the transmission for operation of the engine as a braking device through a second-gear ratio he must accelerate the engine, but the operation will take place smoothly since the engagement of the second-gear clutch will occur without any relative speed.

FIGURE 3 shows a modified embodiment of the mechanism of this invention which comprises means adapted to prevent the engine from exerting an undesirable retarding action on the vehicle when changing up from an intermediate gear to the next higher gear, as already set forth hereinabove. This modified embodiment is also concerned with the substitution of a pilot electromagnetic clutch interposed between the two elements of the intermediate clutch or clutches for the rotary switch provided in the arrangement of FIG. 2, which incorporates a permanent frictional drive, to synchronize the relatively rotating members when changing down to a lower gear.

The wiring diagram portion of FIG. 3 shows clearly that the same arrangement as that of FIG. 1 is illustrated, as far as the storage battery 50, the relays 48, 49 of the device controlling the speed changes, the variable resistor 51, 52 and the switch 58 associated with the accelerator-actuated rod 53, and finally the second-gear relay 55, are concerned. The discrepancy with the arrangement of FIG. 1 lies in the modification of the third-speed relay 56 and in the addition of a relay 72 associated with a switch 73 in the second-gear energizing circuit, according to the following detailed description:

As in the preceding case, the third-gear relay 56 is energized through a circuit 59 comprising a switch 60 connected to the accelerator control rod 53. Its armature $56^1$ carries only one conductor but it comprises in addition to its back contact $56^3$ two front contacts $56^4$ and $56^7$ adapted the former to supply current to the third-gear clutch 5 through conductor 47 and maintain the energization of coil 56, and the latter to maintain the energization of the additional second-gear relay 72. This relay comprises an armature $72^1$ connected to the front contact $55^3$ of the second-gear relay 55, a back contact $72^2$ connected through conductor 46 to the coil of the second-gear clutch 4, and a separate front contact $72^3$. The relay 72 is thus adapted to permit the energization of the second-gear clutch when it is not energized and to prevent this energization when it is energized. Thus, when the relay 56 is energized and supplies current to the third-gear clutch, the relay 72 is also kept in its energized condition through the medium of contact $56^7$ and cuts off the supply of energizing current to the second-gear clutch; consequently, the latter cannot in any circumstances be engaged at the same time as the third-gear clutch.

Independently of this connection, the relay 72 may also be energized through the medium of the switch 73 having its armature or movable contact carrier $73^1$ electrically connected to the armature $56^1$ having an insulated back contact $73^2$, this armature $56^1$ being urged against this back contact $73^2$ by a spring 74 and comprising furthermore a front contact $73^3$ connected to the input terminal of coil 72.

In the form of embodiment illustrated in FIG. 3, the armature or movable element $73^1$ of the switch is controlled by a mechanical bell crank 75 actuated by the accelerator-responsive rod 53; between the bell crank 75 and the armature or like element $73^1$ an air dashpot comprising a cylinder 76 and a piston 77 is disposed, the piston rod 78 being attached to the armature $73^1$, as shown. The dashpot piston 77 is not mounted in an airtight manner in the cylinder 76, but provides a certain amount of leakage for the air due to the provision of orifices or adequate clearances.

In the modified embodiment illustrated in FIG. 4 of the drawings the rod 78 operatively connected to the armature $73^1$ is actuated from a diaphragm 79 having its peripheral outer edges clamped between a pair of shells 80, 81, the volume formed between the shell 81 and the diaphragm 79 communicating through a pipe 82 with the induction manifold of the engine. The diaphragm 79 is connected to the rod 78 through the medium of its central disk 83 in which a gauged orifice 84 is provided to interconnect the chambers formed by the shells 80, 81 and the diaphragm 79.

In the left-hand portion of FIG. 3 showing the electromagnetic clutch assembly there is illustrated the bell-shaped member 3 rotatably fast with the engine, the shaft 7 of the first-gear automatic clutch (not shown), the shafts 18 and 21 of the second and third gear clutches, and the third-gear clutch 5 with its coil 28 supplied with current through the conductor 27 from the collector ring 24 contacting the brush 26 connected to the conductor 47 carried by the stationary casing 45 of the mechanism.

In this modified embodiment of the transmission mechanism, the arrangement of the second-gear electromagnetic clutch 4 differs somewhat in that it consists of a small-diameter clutch having a double friction face and its coil winding located in the engine-driven element of the clutch. This disposition is characterized by certain advantageous features, notably in that the second-gear clutch can be housed within the third-gear clutch, so that the over-all dimensions of the mechanism may be reduced to a substantial extent while reducing the moment of inertia of the member connected to the second-gear shaft.

In this specific embodiment the member constituting the yoke 4 of the second-gear clutch constitutes at the same time the yoke of the third-gear clutch 5 and is secured on the bell-shaped member 3. An armature 95 completes the magnetic circuit of clutch 4 and is rotatably connected—although with a certain axial clearance due to the provision of flexible strips 86—to the yoke thereof. These strips 86 are disposed preferably obliquely or even tangentially to permit the axial displacement of the armature.

Clamped between the armature 85 and the yoke 4 carrying the coil 39, when the latter is energized, is a thin disk 87 mounted through splines on the second-gear shaft 18, this disk 87 comprising apertures 88 to avoid magnetic short-circuits according to the known method.

The armature 85 carries through the medium of a ring 89 a toroidal low-power pilot electromagnet 90 which can move freely towards the disk 87 acting as an armature therefor, this electromagnet being prevented by a shoulder from moving away from the disk 87 beyond a certain distance representing the maximum electromagnetic gap.

The pilot electromagnet 90 is secured to resilient arms 1 rigid with a ring 92 adapted to effect a certain angular displacement by rotating on a journal formed in the yoke 4. The resiliency of these arms 91 tends to move the pilot electromagnet 90 away from the disk 87 and to cause it to engage the aforesaid shoulder.

The ring 92 constitutes the rotary member of the switch through which current is supplied to the coil 39. To this end, it carries an insulating lining 93 having embedded therein conducting plates such as 95 which are electrically connected to the current supply and in intermittent contact with other brushes, for example the brushes 96 connected to the winding 39.

In fact, this ring 92 is adapted to effect a certain angular movement relative to the yoke 4, this movement being limited by check members between two extreme positions. When the ring 92 is in its foremost position relative to the direction of rotation of the engine, the brushes 96 contact the insulated portion of the ring, and the coil 39 is not energized. When on the other hand the ring 92 occupies the rearmost position relative to the direction of rotation of the engine, the brushes 96 contact the conducting plates 94 and the coil 39 is electrically connected to the current supply.

An insulated conductor 97 secured on one of the arms 91 connects the plates 94 to the winding of the pilot clutch 90 and therefore the latter is energized immediately as current is supplied to the second-gear clutch.

This current is fed to the brushes 95 through a conductor 98 secured on a bell-shaped member 99 carrying through the medium of an insulating lining the collector ring 23 connected to the conductor 98 and associated with the brush 25 fed with current from the conductor 46.

This mechanism operates as follows:

The vehicle is started by operating the automatic clutch and the change from first gear to second gear takes place in the conditions already set forth hereinabove but briefly reminded hereafter to take due regard of the modification brought to the second-gear clutch.

When the vehicle speed and engine load conditions are such as to justify a change from first gear to second gear, the governor energizes the relay 48 and the contact 48³ thereof permits the change to second gear, but only when the driver releases intentionally the accelerator pedal. This manoeuvre causes the switch 58 to close, and as a result the relay 55 is energized and remains energized to permit the passage of current to the second-gear clutch through its contact 55³, then through contacts 72¹ and 72² of switch 72 in its inoperative position, and conductors 46 and 98.

The pilot clutch 90 energized immediately from conductor 98 through the path just described engages the disk 87 which, at this time, rotates at a lower speed than the engine since it is connected to the second-gear shaft, and therefore this speed is lower than that of the main clutch yoke 4, so that the ring 92 of the switch is either moved angularly to the rear in relation to the direction of rotation of the engine, or kept in this angular position if it has not diverged therefrom, so that the winding 39 of the main clutch is energized immediately through the path comprising the plates 94 and brushes 96. The yoke 4 and armature 85 of this clutch will thus engage the disk 87 and the vehicle is driven in second gear.

It will be noted that during this operation the engine has not exerted any retarding torque of the running vehicle, for the first-gear transmission path comprises a freewheel device.

When the vehicle is driven in second gear and its speed as well as the engine load are suitable for justifying the change to third or top gear, the governor energizes the relay 49 while maintaining the energization of relay 48. Thus, contact 49³ is energized, switch 61 being assumed to be closed, that is, in its normal position when the vehicle is running.

If, under these conditions, the driver varies the position of the accelerator pedal without releasing it completely, the switch 60 will not close and consequently the relay 56 is not energized and will not engage the third-gear clutch. If the movements of the accelerator pedal are relatively progressive as when this pedal is not released suddenly and completely, the air leak between the piston 77 and cylinder 76 of the dashpot is such that the switch 73 is not actuated, and that consequently the relay 72 is not energized, thus maintaining the transmission in the second gear ratio.

If, on the contrary, the driver releases completely the accelerator pedal, as required for changing up to third gear, the rapid upward movement of the pedal prevents the air compressed between the cylinder 76 and piston 77 from escaping through the leakage orifice or clearance, and thus the switch 73 is actuated and causes the relay 72 to be energized and to discontinue the supply of current to the second gear clutch. The latter is thus released immediately as the driver begins to release the accelerator pedal unhesitatingly.

When the accelerator pedal thus quickly released attains subsequently its fully raised or throttle-closing position, the switch 60 closes and causes the third-gear clutch to be engaged through the path described hereinabove, while energizing the relay 72 to de-energize the second-gear clutch coil permanently.

From the foregoing it is evident that this device will disengage the second-gear clutch before engaging the third-gear clutch, thus eliminating the detrimental fierce shock most likely to be occasioned by the retarding torque of the engine between the beginning and the end of the accelerator pedal release movement.

The same result is obtained if the switch 73 is controlled by the device illustrated in FIG. 4. In this case, as long as the accelerator movements have a sufficient progressiveness, the orifice 84 interconnecting the two faces of the diaphragm 79 is effective to prevent the pressure differential between the two faces of this diaphragm from becoming sufficient for controlling the operation of switch 73. On the other hand, if the accelerator pedal is released quickly or unhesitatingly, the partial vacuum developing in the chamber formed between the shell 81 and the diaphragm 79 increases much more rapidly than in the other chamber within the shell 80, and the diaphragm 79 is therefore urged downward to an extent sufficient to actuate the switch 73.

When changing down from third speed to second speed (this manoeuvre being effected irrespective of the position of the accelerator pedal) the engine, which was previously connected through clutch 5 to the third-gear shaft, rotates at a speed always lower than that of the second-gear shaft and therefore than the speed of the disk 87 at the time when the governor de-energizes the relay 49, so that the conductor 46, brush 25 and therefore conductor 98 are fed with current from relay 48.

The conductor 98, through the intermediary of brushes 95 in permanent sliding contact with the plates 94, supplies current through conductor 97 to the coil winding of the pilot electromagnet 90 which is thus attracted for engagement with the disk 87.

If, at this moment, the disk 87 rotates faster than the engine, it carries along the pilot electromagnet 90, and through the arms 91, the ring 92 in a forward direction relative to the engine direction of rotation. The brushes 96 are then caused to contact the insulated portion of ring 92, and coil 39 is not energized.

Under these conditions, the operative connection between the engine and the second-gear shaft 18 is characterized by a very low torque, that is, the torque that can be transmitted through the pilot clutch 90.

Therefore, except for this low torque, the operative connection is the same as that provided by a freewheel device and the engine cannot exert any retarding torque likely to brake the vehicle.

When the engine speed has increased to a value very slightly above the speed of the second-gear shaft and disk 87, as will occur very rapidly in the usual case of the automatic gear change from third to second speed wherein the driver keeps the accelerator pedal depressed, the pilot clutch 90 and consequently the ring 92 are displaced angularly to the rear relative to the engine and the conducting plates 94 which are energized and carried by this ring will contact the brushes 96 through which they energize the coil winding 39. Then the second gear is engaged without any shock or jolt since the relative speed of the two component elements of its clutch is still practically zero. Under these conditions, the ring 92 will remain still relative to the clutch yoke 4 and the clutch proper will remain engaged in both directions of torque transmission as long as its energization through conductor 46 is not discontinued.

If this energization is discontinued by the action of relay 72 for changing up to third gear or by the action of relay 48 for changing down to second gear, the coil winding of the pilot electromagnet 90 becomes de-energized simultaneously with the main coil 39 and no torque is transmitted through the second-gear clutch.

Although a few different forms of embodiment of the invention have been shown and described herein, it will be readily understood by anyone conversant with the art that many details may be modified therein without departing from the spirit and scope of the invention as set forth in the appended claims.

I claim:

1. In an automatic transmission mechanism, a driving shaft, a driven shaft, a low gear torque transmitting means coupled to the driven shaft and including a freewheel means, an automatic starting clutch for coupling the driving shaft with the low gear torque transmitting means, further intermediate and high gear torque transmitting means of less reduced ratios, electromagnetic clutches for coupling the driving shaft with the gear torque transmitting means of less reduced ratios, said electromagnetic clutches having energizing circuits including a source of electrical energy, an automatic governor for controlling the engagement of each of the further gear torque transmitting means of less reduced ratios, said governor including contact means to control the energizing circuit of the corresponding electromagnetic clutch and controlled by the governor, said energizing circuit comprising furthermore a self-holding electric closing relay, a switch for controlling each electric closing relay, said switch only closing, so as only to permit an effective change in the ratio upon an increase in speeds, when a power regulating member of the motor is brought into its position at which it interrupts the driving torque.

2. Mechanism according to claim 1, characterized in that means are provided for ensuring a variable-current energization of the electromagnetic clutches, this energization having its minimum value when the engine power output regulating member occupies a position in which the engine torque is discontinued, by means of a resistor inserted in series in the clutch energizing circuits, this resistor being variable according to the position of the engine-power output adjustment member.

3. Mechanism according to claim 1 wherein the energizing circuit of each electromagnetic clutch comprises a contact established by said governor, an electric closing relay being fed through such contact in parallel with its armature closing said circuit and kept in its energized condition by said armature, a switch for controlling said electric closing relay being operatively connected to an accelerator pedal through a control member common to all these switches, said switch being closed in the released or upper position of said pedal, the electric closing relay of the circuit corresponding to each gear immediately above an intermediate gear comprising in addition an armature for opening the circuit corresponding to the next lower gear which is positioned after the relay of this last mentioned circuit.

4. Mechanism according to claim 1, wherein said electromagnetic clutch of the intermediate gear is provided with a torque limiting device, which is so arranged and adjusted as to permit the transmission, in the direction of rotation of the engine, of a torque having a value equal to or higher than the maximum engine torque, and in the reverse direction, of a torque equal to or higher than the reaction torque of the engine.

5. Mechanism according to claim 1, characterized in that the electromagnetic clutch of the intermediate gear is provided with a friction-driven synchronizing switch responsive to the relative speed of the engine and of the corresponding clutch, whereby its coil winding cannot be energized as long as the engine rotates more slowly than the clutch shaft corresponding to the desired gear ratio.

6. Mechanism according to claim 1, characterized in that it comprises in the electromagnetic clutch energizing circuit a driver-actuatable switch adapted to prevent the gear change to an upper gear, in order to permit the negative operation of the engine for braking purposes through the lower gears except the first gear.

7. Mechanism according to claim 1, wherein there is provided in addition, in the clutch circuit of each intermediate gear, after the relay controlling the closing of the clutch circuit concerned, a cut-off relay fed in parallel from the circuit energizing the clutch of the next upper gear and through the medium of switch means associated with control means adapted to close said switch means when an accelerator pedal is released suddenly and completely, said cut-off relay being subsequently held in its operative condition by the relay controlling the closing of the circuit of the clutch associated with the next higher gear ratio, whereby the engine is prevented from exerting an undesired retarding action on the transmission system when the accelerator pedal is released suddenly and completely, as provided for changing up to a higher gear.

8. Mechanism according to claim 7, characterized in that the control means associated with said switch means consist of a mechanical linkage operatively connected to the accelerator pedal or throttle control means and adapted to actuate the movable member of said switch means through the intermediary of a suitably adjusted pneumatic dashpot of the leakage type.

9. Mechanism according to claim 7, characterized in that the control means associated with said switch means consist of an air-tight casing having a diaphragm disposed therein, said diaphragm being connected to the movable member of the switch and adapted to divide said casing into two chambers, one chamber being connected to the induction manifold of the engine and communicating with the other chamber through a gauged orifice, whereby a quick variation in the partial vacuum therein will close said switch.

10. Mechanism according to claim 1, characterized in that the intermediate gear clutch is provided with a synchronizing switch device of the angular-movement type responsive to variation in the relative velocities of rotation of the engine and of the output member of this clutch, whereby said clutch cannot be energized as long as the engine rotates at a speed lower than that of its output member, said switch control means consisting of a pilot electromagnetic clutch interposed between the two component elements of the corresponding main clutch and operatively connected mechanically to the movable member of said switch, and electrically and permanently to the current input terminal of said clutch, whereby said switch is actuatable only when changing to the desired gear.

References Cited in the file of this patent
UNITED STATES PATENTS

| | | |
|---|---|---|
| 2,638,793 | Winther et al. | May 19, 1953 |
| 2,718,797 | Gravino | Sept. 27, 1955 |
| 2,733,614 | Kreis | Feb. 7, 1956 |
| 2,809,534 | Winther | Oct. 15, 1957 |